United States Patent
Lu et al.

(10) Patent No.: US 8,210,289 B1
(45) Date of Patent: Jul. 3, 2012

(54) HIGH VELOCITY MICROBOT

(75) Inventors: Ryan P. Lu, Carlsbad, CA (US); Ayax D. Ramirez, Chula Vista, CA (US); Stephen D. Russell, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 403 days.

(21) Appl. No.: 12/685,808

(22) Filed: Jan. 12, 2010

(51) Int. Cl.
*B62D 57/00* (2006.01)

(52) U.S. Cl. .................. 180/7.1; 180/10; 180/21; 901/1

(58) Field of Classification Search .................. 180/7.1, 180/10, 21
See application file for complete search history.

(56) References Cited

U.S. PATENT DOCUMENTS

| | | | | |
|---|---|---|---|---|
| 4,501,569 A | * | 2/1985 | Clark et al. | 446/458 |
| 6,298,934 B1 | * | 10/2001 | Shteingold | 180/10 |
| 6,378,634 B1 | * | 4/2002 | Yim | 180/7.1 |
| 7,013,200 B2 | * | 3/2006 | Wakui | 700/245 |
| 7,056,185 B1 | * | 6/2006 | Anagnostou | 446/456 |
| 7,165,637 B2 | * | 1/2007 | Tanielian | 180/7.1 |
| 7,726,422 B2 | * | 6/2010 | Sun et al. | 180/7.1 |
| 2004/0182614 A1 | * | 9/2004 | Wakui | 180/7.1 |
| 2008/0083571 A1 | * | 4/2008 | Troy | 180/7.1 |
| 2008/0149404 A1 | * | 6/2008 | Yang | 180/7.1 |
| 2009/0099709 A1 | * | 4/2009 | Troy | 701/1 |
| 2010/0243342 A1 | * | 9/2010 | Wu et al. | 180/7.1 |
| 2011/0155481 A1 | * | 6/2011 | Mondl | 180/7.1 |

* cited by examiner

*Primary Examiner* — Lesley D Morris
*Assistant Examiner* — Marlon Arce
(74) *Attorney, Agent, or Firm* — Arthur K. Samora; Kyle Eppele

(57) ABSTRACT

A microbot includes a spherical housing, first and second servomotors that are located internal to the housing and oriented horizontally and orthogonal to each other, and a plunger within the housing that selectively extends in the vertical direction. Castors are attached to each servomotor; and traction balls corresponding to each castor are placed so that each ball frictionally engages both a respective castor and the interior of the housing at the same time. As the servomotors rotate, the attached castors also rotate, which causes rotation of the traction balls and rolling of the housing, and results in translation of the microbot in the horizontal plane. As the plunger rapidly extends, it strikes the interior surface of the housing with sufficient force to cause a hopping motion of the microbot in the vertical direction.

15 Claims, 6 Drawing Sheets

HIGH VELOCITY MICROBOT

FEDERALLY-SPONSORED RESEARCH AND DEVELOPMENT

This invention (Navy Case No. 099706) is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice 619-553-2778; email T2@spawar.navy.mil.

FIELD OF THE INVENTION

This disclosure relates generally to robotics. More specifically, this disclosure relates to robots that can move at a high rate of velocity, while at the same time being able to perform high level robot functions and having a particularly small size.

BACKGROUND OF THE INVENTION

There is currently a lot of interest in autonomous microrobots, or microbots, which has arisen due to the advances in micro-electromechanical systems (MEMS) and nano-electromechanical systems (NEMS) manufacturing techniques. Microbots can incorporate many capabilities due to their small size, such as audio and video surveillance in locations where it is too dangerous for humans or dogs, and where typical robots are too small. Microbots can also be used for detection of biological, nuclear, radiological, explosive and chemical agents in similar scenarios. Information collected can then be transmitted to a safe, remote location.

Unfortunately, microbots have many issues that need to be resolved in order to make them practical. In particular, microbots move much too slowly, as many microbots currently rely on mini-tank treads, which can provide propulsion at just a couple of centimeters/second. What is desired is a greatly increased improvement of the velocity of a microbot (by orders of magnitude), matching that of fast radio-controlled toy cars, but in a nominal microbot package size of two to three inches in diameter.

In view of the above, it is an object of the present invention to provide a high velocity microbot with greatly increased velocity over prior art microbots. Another object of the present invention is to provide a high velocity microbot that has the ability to cross over obstacles via a selective hopping motion in the vertical direction. Yet another object of the present invention to provide a microbot of greatly decreased size, but without sacrificing velocity for the microbot. Still another object of the present invention is to provide high velocity microbots wherein a plurality of microbots can be networked for greater surveillance coverage of a desired area. A further object of the present invention is to provide microbots that can be easily manufactured in a cost-efficient manner using current MEMS and/or NEMS techniques.

SUMMARY OF THE INVENTION

A high velocity microbot and methods for use therefor in accordance with several embodiments of the invention includes a spherical housing, a means for locomotion of the microbot in the horizontal plane that is located internal to the housing, and a plunger that oriented to selectively extend in the vertical direction. In some embodiments, the plunger strikes the interior surface of the housing when it extends to cause motion of the microbot in the vertical direction. In other embodiments of the invention, the plunger can be oriented vertically and sized so that it is flush with the exterior surface of the housing when the plunger is retracted. For these embodiments, a rapid forceful extension of the plunger downward can establish a force on the ground (instead of the interior surface of the spherical housing) that will cause vertical upward motion of the microbot.

In several embodiments, the locomotive means can include a first servomotor and a second servomotor that are oriented in the horizontal plane and orthogonal to each other. A castor can be attached to each respective motor; and rubberized traction balls corresponding to each castor can be placed within the housing so that each ball frictionally engages both a respective castor and the interior surface of the housing at the same time. As the motors rotate, the attached castors also rotate, which further causes rotation of the ball. Since the traction ball is frictionally engaged with the interior surface of the housing, rotation of the ball further in rotation of the housing, which results in translation (rolling) of the microbot in the horizontal plane.

The microbot can be sized for different applications, and internal payloads of various types of sensors can be incorporated, according to the needs of the user. Transceivers can also be incorporated with the housing to network the microbots and form a robot with many different microbot nodes. The housing can also be made of different materials, such as high density polyethylene (HDPE), polycarbonates, stainless steel or aluminum, according to different user needs.

The methods of propelling a robot at high velocity according to several embodiment of the present invention can include the steps of providing a spherical housing, installing motors internal to the housing orthogonally as described above for locomotion of said robot in the horizontal plane and selectively extending a plunger to propel said robot in the vertical direction.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED WRITTEN DESCRIPTION OF THE EMBODIMENTS

Figure 1:
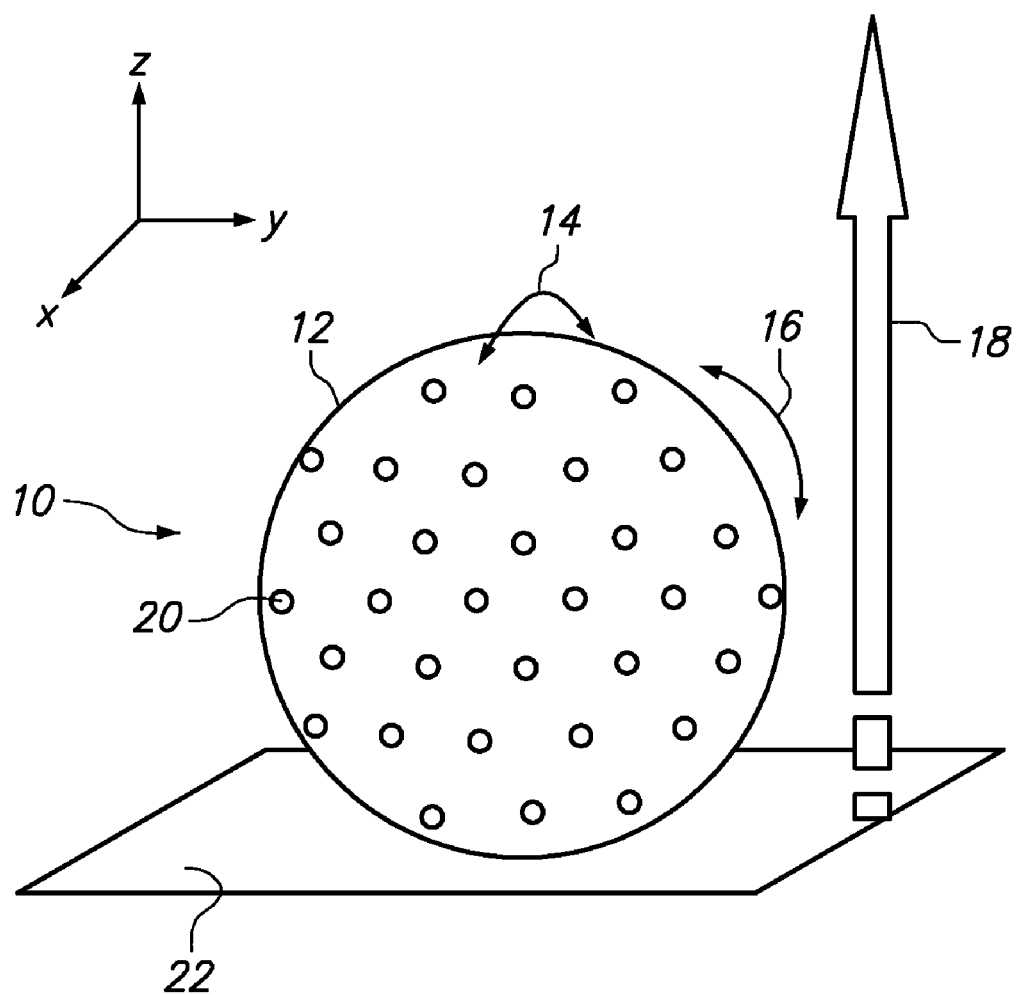
FIG. 1 is a side elevational view of the high velocity microbot according to several embodiments of the present invention.

Referring initially to FIG. 1, a high velocity microbot according to several embodiments of the present invention is shown and is generally designated by reference character 10.

As shown, microbot 10 includes a spherical housing 12, which allows for translation in the x-direction and y-direction in a rolling motion along the horizontal plane 22, as indicated by arrows 14 and 16, respectively. The microbot further includes a plunger to accomplish locomotion in the z-direction (arrow 18) via a hopping action. The plunger and the manner in which motion in the z direction is accomplished will be described in further detail below.

In some embodiments, the spherical housing 12 can have a diameter of about 2 to 3 inches that will be constructed out of about one millimeter (1 mm) thick polycarbonate, although other diameters, thicknesses and materials may be employed. For example, if heavier/larger payloads are desired, if may be desirable to have a microbot with a housing 12 that has a larger diameter. Alternatively, if MEMS or NEMS technology is used, the microbot 10 could be configured with a spherical housing having a diameter of less than 1 mm in diameter.

The surface of the polycarbonate sphere may be perforated with holes 20 as shown in FIG. 1, to allow for ventilation through the housing. In some embodiments, the holes are approximately 1 mm in diameter and are equally spaced on the surface of the sphere. In other embodiments, such as applications where watertight integrity of the housing 12 is needed, the spherical housing can be formed with equidistant dimples instead of holes 20. In still other embodiments, the housing can be formed with equidistant protuberances, for greater traction of the housing 12 during locomotion along horizontal plane 22.

Figure 2:
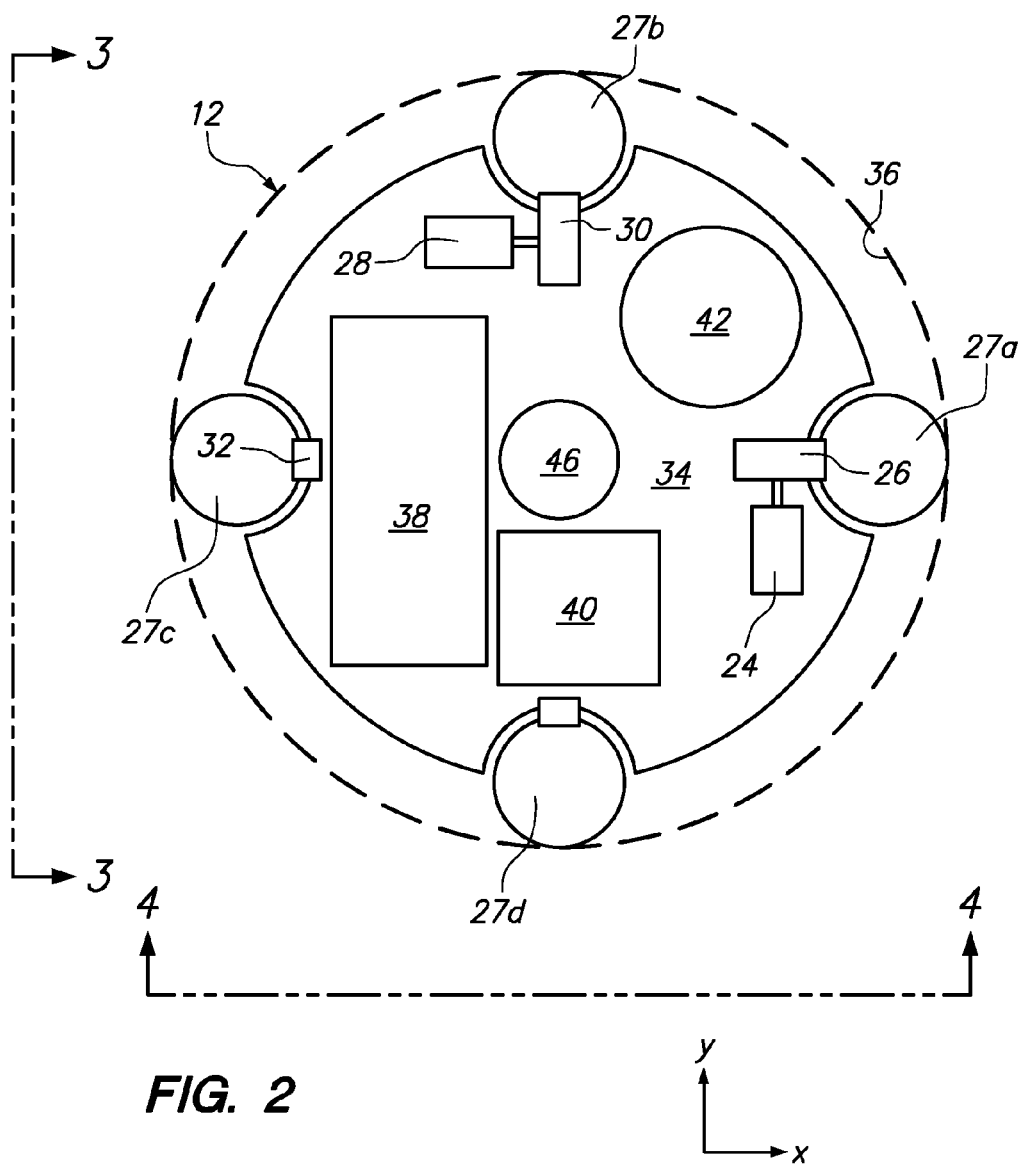
FIG. 2 is a top plan view of the microbot of FIG. 1, with portions of the spherical housing removed to illustrate the internal components of the microbot with greater clarity.
Figure 3:
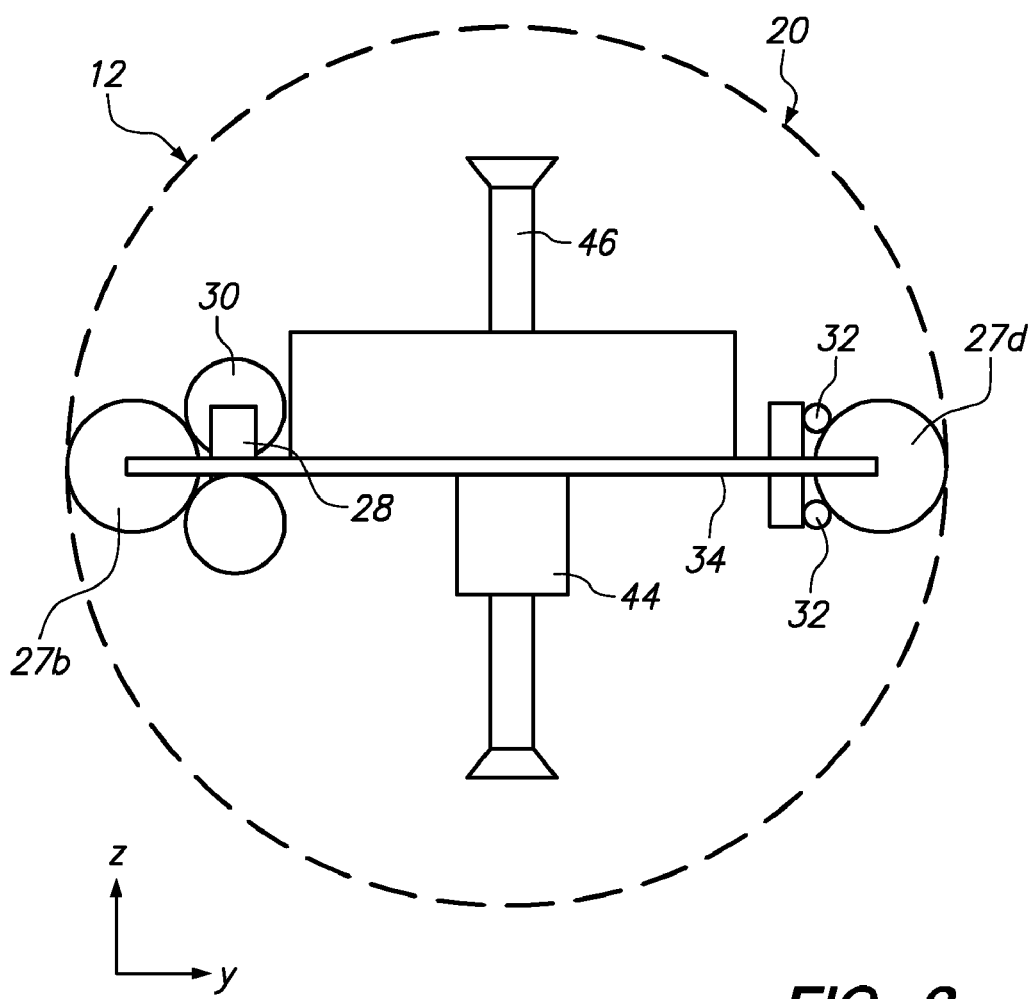
FIG. 3 is a cross-sectional view taken along the line 3-3 in FIG. 2.
Figure 4:
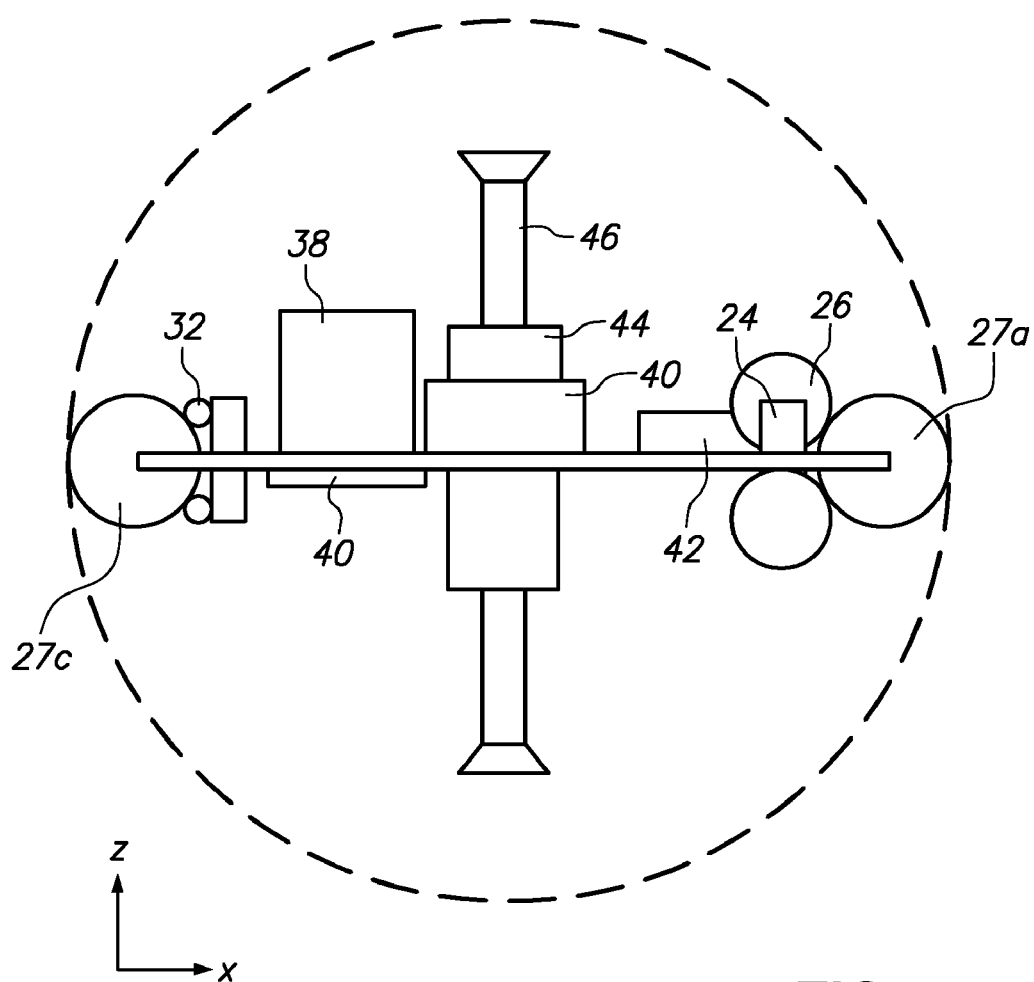
FIG. 4 is a cross-sectional view taken along the line 4-4 in FIG. 2.

Referring now primarily to FIGS. 2-4, the manner in which translational locomotion for the microbot 10 is accomplished is described more fully. As shown in FIG. 2, the microbot 10 includes a printed circuit board (PCB) 34 that is located internal to spherical housing 12, and a x-servomotor 24 that is mounted on the PCB 34. An x-castor 26 is attached to x-servomotor 24, and a traction ball 27a is frictionally engaged with x-castor 26 and with interior surface 36 of spherical housing 12. Similarly, a y-servomotor 28 is mounted on PCB 34, as shown in FIG. 2. A y-castor 30 is mounted to y-servomotor 28, and another traction ball 27b is frictionally engaged with y-castor 30 and interior surface 36. For several embodiments, y-servomotor 28 can be oriented orthogonally to x-servomotor 24. State-of-the-art servomotors four millimeters (4 mm) in diameter and capable of 9000 rpm are commercially available and can be suitable for this application.

To obtain translational motion, x-servomotor 24 controls motion in the x-direction and y-servomotor 28 controls motion in the y-direction. As x-servomotor 24 and y-servomotor 28 selectively rotate, the x-servomotor 24 and y-servomotor 28 spin x-castor 26 and y-castor 30, respectively. X-castor 26 and y-castor 30 spin rubberized traction balls 27a and 27b, which are frictionally engaged with interior surface 36 and spherical housing 12. Because of the frictional engagement, as the traction balls 27a-b spin, the friction against the interior surface 36 causes the microbot 10 to roll forwards or sideways, in a manner that is analogous to that of a mouse for a personal computer. Through the variation of the velocity of the servomotors 24, 28, translational rolling locomotion of microbot 10 in any direction in the horizontal plane 22 can be accomplished.

The remaining two of the four traction balls 27c, 27d shown in the FIGS. 2-6 that are not frictionally engaged with castors 26, 30 need not be controlled by servomotors 24, 28 (although the balls 27 can also be motorized to increase torque for the microbot 10, if needed). These balls 27 may spin freely during translational motion of microbot 10, and these traction balls 27 are kept in place with free spinning pinions 32 that are mounted to PCB 34. The traction balls 27 can be ruggedized, if desired, to handle shock and environmental environments effects such as military specification shock metrics. Gyroscopic stabilizers (not shown in the Figures) can be used to keep the internal printed circuit board (PCB) 34 in a level, i.e. horizontal, orientation.

Figure 5:
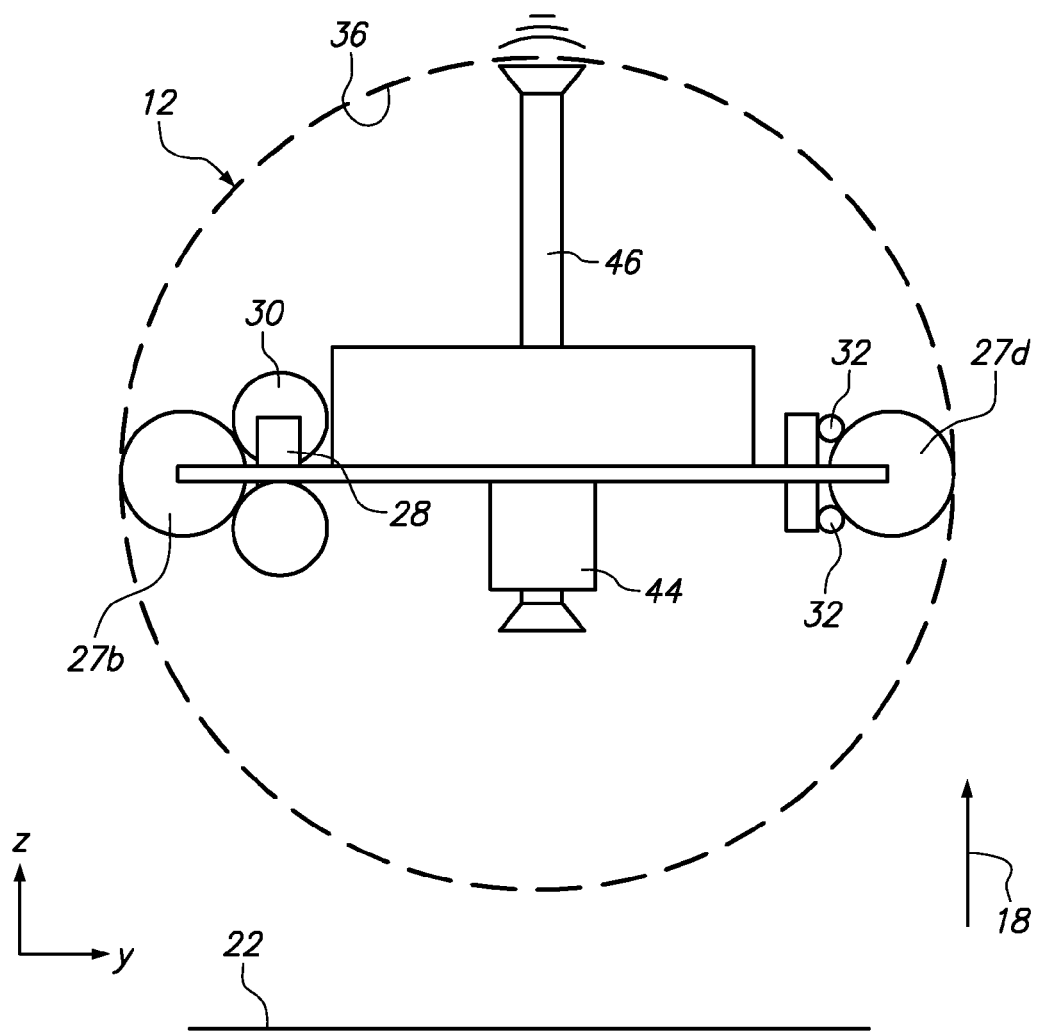
FIG. 5 is the same view as FIG. 3, but with the plunger for the microbot extended to cause motion in the vertical direction; and, FIG. 6 is the same view as FIG. 3, but with multiple printed circuit boards shown, in order to illustrate several alternative embodiments of the present invention.

As shown primarily to FIGS. 3-6, the z-motion is made possible through an actuator 44 and a plunger 46 that mounted to PCB 34 and that extends orthogonally from PCB 34. In some embodiments, and as shown in the FIGS. 3, 4 and 6, the actuator has a retracted position wherein the plunger 46 is spaced-apart from interior surface 36 of spherical housing 12. As shown in FIG. 4, plunder 46 also has an extended position wherein the plunger 46 contacts interior surface 36, as shown in FIG. 5. For other embodiments (not shown in the Figures), the plunger extends outwardly from spherical housing 12 when in the extended position. To move the plunger between a retracted position and an extended position, the actuator 44 can be a spring loaded, or it can also be an electromagnetic mechanism.

For operation, selective activation of servomotors 24, 28 cause microbot 10 to roll in the horizontal plane 22, as described above. If microbot 10 becomes stuck, for example in a pothole or other obstruction, actuator 44 can be selectively activated to cause plunger 46 to strike interior 36 with enough force to thereby create a hopping motion for microbot 10 in the z-direction as indicated by arrow 18. In one embodiment, a plunger 46 can strike the top of interior surface 36 with enough force to cause a hopping motion for the entire microbot 12. The motion in the z-direction caused by this action can exceed 2 feet or more in vertical motion, and can be sufficient to clear most obstructions. In other embodiments, the plunger portion may protrude from the base of the microbot unit in the extended position and strike horizontal plane 22, which causes a reactive force to thereby cause microbot 10 to hop in the vertical direction.

As shown in FIGS. 2-6, the microbot 10 can further include a payload 38, which can be mounted on PCB 34. Payload 38 can be chosen according to the function of the microbot and the needs of the user. Examples of payloads can include biological, nuclear, radiological, explosive and chemical detectors. In addition to biological, chemical, radiological, explosive and nuclear sensors, the microbot unit may also contain any other combination of sensors. Examples include magnetic sensors for detection of magnetic anomalies (useful for mine detection or proximity detection), hyper spectral and multispectral sensors, and/or imaging devices. The modular nature of the microbot allows for numerous configurations of payload 38. For some of the configurations where the payload 38 is a sensor, the holes 20 establish a path of fluid communication from the surrounding environment through spherical housing 12 and into the interior of the microbot, to facilitate the sensor operations.

As shown in FIGS. 2-6, microbot 10 can also include a integrated circuit (IC) 40 and a power source 42, which can be fixed to PCB 34 within the spherical housing 12. IC 40 can include micro-transceivers (or the micro-transceivers can be fixed to PCB 34) to allow for remote control of servomotors 24, 28 and actuator 44 to position microbot 10 at a desired location using Global Positioning System (GPS) coordinates. Alternately, the microbot unit 10 may be programmed through its on-board circuitry in IC 40 to perform desired search algorithms across x-, y-, and z-space partial volumetric search) and then report back its location using integrated wireless communications (RF or optical). As shown in FIG. 4, IC 40 is mounted to the underside of PCB 34 in some embodiments. It should be appreciate that for many of the embodiments of the present invention, any of the components of the microbot 10, such as servomotors 24, 28, pinions 32, payload 38, IC 40 and power source 42 could be mounted on either side of PCB 40, according to the needs of the user.

The structure and cooperation of structure described above also allows for a plurality of microbots 10 to be networked, for operation as a composite unit. The micro-transceivers can allow for a plurality of microbots to establish communications links both with the user, and with each other. With this configuration, the microbots could be considered as nodes, and if one microbot 10 node requires "assistance" from another microbot node, it may confirm the presence of another microbot 10 through a communications link or proximity sensors. The "assistance" may be, for example, to extend it communications path to the user or to still another microbot node 10, through use of a communications relay, mechanical assistance for cooperative motion across a barrier, confirmation of sensor data.

Figure 6:
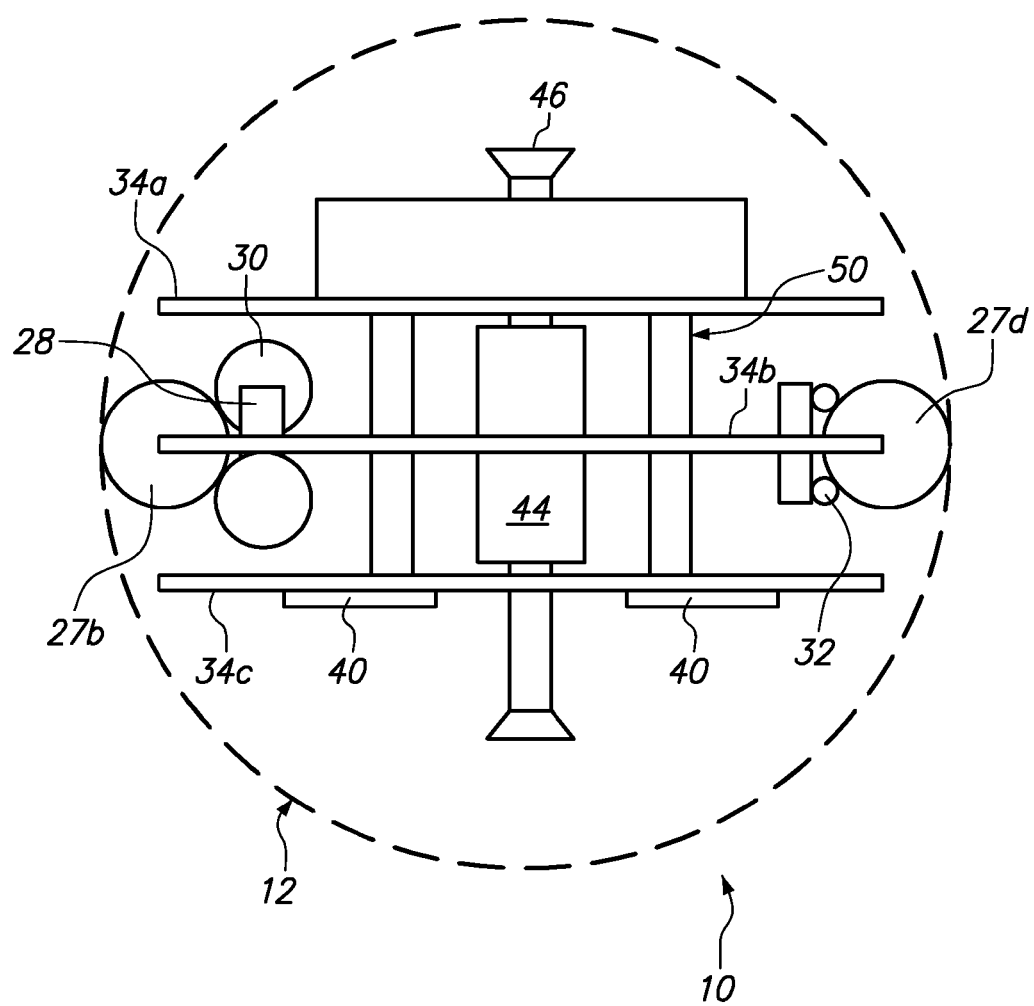

An alternative embodiment of a microbot unit is shown containing a three layer PCB design as shown in FIG. 6, wherein three (or more) PCB's 34a, 34b and 34c are positioned within spherical housing 12. These embodiments allow modular designs wherein PCB's 34 may be interchanged for specific applications. The multiple PCB's allow for developmental work to be performed in parallel to provide additional cost savings. For these embodiments, the mechanical components (servomotors 24, 28, castors 26, 30, balls 27 and pinions 32) to be mounted on center PCB 34b, payload 38 to be fixed to one of another PCB's 34a or 34c, and the wireless communication components to be fixed to the other of PCB's 34a or 34c. All three PCB's 34a-34c can then be integrated together through ribbon cables 50, as shown in FIG. 6.

As mentioned above, spherical housing 12 may be constructed from polycarbonate for high mechanical strength and structural rigidity, and light weight, but alternate materials may be desirable for use in specific environments or to improve maneuverability. Other materials such as stainless steel, carbon graphite, carbon fiber, fiberglass, or composite materials could be used. As also mentioned above, spherical housing 12 may be perforated to allow chemicals to permeate into the microbot unit for detection by the integrated sensors. In still other embodiments, microbot 10 may also be designed to withstand large shocks by the incorporation of internal shock absorbers (not shown in the Figures). The inner surface of the shell may contain a texture or be coated with a high friction coefficient coating to improve the frictional engagement with balls 27a-d and thereby reduce mechanical losses and increase the translational velocity of microbot 10 along horizontal plane 22.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A high velocity microbot comprising:
   a spherical housing, said spherical housing defining an interior surface;
   a first motor, and a second motor oriented orthogonally to said first motor;
   a first castor attached to said first motor, and a second castor attached to said second motor;
   a first traction ball frictionally engaged with said first castor and said interior surface;
   a second traction ball frictionally engaged with said second castor and said interior surface;
   and,
   a plunger oriented to selectively extend in the vertical direction.

2. The microbot of claim 1, wherein selective extension of said plunger causes said plunger to strike said interior surface to cause motion of said microbot in the vertical direction.

3. The microbot of claim 1, wherein said spherical housing defines an exterior surface for said microbot, and further wherein said plunger has a retracted position and an extended position, and still further wherein said plunger extends past said exterior surface, when said plunger is in said extended position.

4. The microbot of claim 1, further comprising a payload located within said housing.

5. The microbot of claim 4, wherein said payload is selected from the group consisting of biological sensors, chemical sensors, nuclear radiation sensors, or explosive sensors.

6. The microbot of claim 5 wherein said spherical housing has a plurality of holes formed therein to establish a path of fluid communication between the surrounding environment and said payload to facilitate operation of said sensors.

7. The microbot of claim 1, wherein said spherical housing is made of a material selected from the group consisting of high density polyethylene (HDPE), polycarbonates, stainless steel or aluminum.

8. A high velocity robot comprising:
   a plurality of networked nodes;
   each node further including a spherical housing, said spherical housing defining an interior surface;
   a first motor, and a second motor oriented orthogonally to said first motor;
   a first castor attached to said first motor, and a second castor attached to said second motor;
   a first traction ball frictionally engaged with said first castor and said interior surface;
   a second traction ball frictionally engaged with said second castor and said interior surface; and,
   each node further including a plunger oriented to selectively extend in the vertical direction.

9. The robot of claim 8, wherein selective extension of said plunger causes said plunger to strike said interior surface to cause motion of said node in said vertical direction.

10. The robot of claim 8, wherein housing defines an exterior surface for said node, and further wherein said plunger has a retracted position and an extended position, and still further wherein said plunger extends past said exterior surface, when said plunger is in said extended position.

11. The robot of claim 8, further comprising at least one of said payloads located within at least one of said housings.

12. The robot of claim 11, wherein said payload is selected from the group consisting of biological sensors, chemical sensors, nuclear sensors, or explosive sensors.

13. The robot of claim 11 wherein said spherical housing has a plurality of holes formed therein to establish a path of fluid communication between the surrounding environment and said payload to facilitate operation of said sensors.

14. The robot of claim 8, wherein said spherical housing is made of a material selected from the group consisting of high density polyethylene (HDPE), polycarbonates, stainless steel or aluminum.

15. A method for propelling a robot at high velocity, said method comprising the steps of:

A) providing a spherical housing, said spherical housing defining an interior surface;
B)
B1) orienting two motors orthogonal to each other in a horizontal plane;
B2) attaching a respective castor to each motor;
B3) frictionally engaging each said castor and said interior surface with a corresponding traction ball; and,
C) selectively extending a plunger to propel said robot in the vertical direction.

* * * * *